United States Patent
Greenspan

[19]

[11] 3,877,802

[45] Apr. 15, 1975

[54] METHOD OF ENLARGING IMAGES WITHOUT LENSES AND DISPLAY DEVICE UTILIZING THE METHOD

[76] Inventor: Myron Greenspan, 154 Girard St., Brooklyn, N.Y. 11235

[22] Filed: Apr. 16, 1973

[21] Appl. No.: 351,495

[52] U.S. Cl. .................................. 353/77; 353/98
[51] Int. Cl. ......................................... G03b 21/28
[58] Field of Search ............ 353/38, 98, 99, 77, 78; 350/292

[56] References Cited
UNITED STATES PATENTS

| | | | |
|---|---|---|---|
| 1,193,999 | 8/1916 | Dixon | 350/292 |
| 2,660,087 | 11/1953 | Domeshek | 353/38 |
| 3,375,753 | 4/1968 | Ramsell | 353/99 |
| 3,510,216 | 5/1970 | Wagman | 353/99 |

Primary Examiner—Richard E. Aegerter
Assistant Examiner—A. J. Mirabito

[57] ABSTRACT

A method of enlarging a two-dimensional image along two of its planar orthogonal directions includes the step of forming a light beam consisting of adjacent substantially parallel light ray portions oriented in a first direction, said parallel light ray portions together defining the image. The light ray portions are separated into a plurality of spaced light rays along a direction corresponding to a planar direction of the image. The light rays are directed in spaced relation to one another in a second direction orthogonal to the first direction. The light rays are again separated along a direction corresponding to an other planar direction of the image into a further plurality of light rays and directed in spaced relation to one another in a third direction which is mutually orthogonal to the first and second directions. The further light rays together define the image in a dissected or dispersed form — the spaced relation of the further light rays defining a viewing area which is greater than that defined by the original adjacent light ray portions. A display device which embodies the principal of the method includes a substantially planar rectangular enclosure having spaced horizontal and vertical sides when mounted on a wall. The depth of the enclosure is substantially smaller than its height and width. The enclosure is provided with four elongated outer chambers which together define a central rectangular chamber. A scattering surface in the form of a planar reflector, comprising a plurality of elongated spaced and parallel reflecting surfaces, is positioned in one of the outer chambers. A similar planar reflector is positioned in the central chamber. A rectangular projection screen generally defining a plane parallel to the planar enclosure forms one of the exterior walls of the central chamber. The planar reflectors in the outer and the central chambers are so arranged so that substantially parallel rays, after being transmitted through a transparency, are directed from said one outer chamber into the central chamber along the second direction substantially parallel to the horizontal spaced sides. The further light rays are directed from the central chamber onto the projection screen along the third direction substantially normal to the plane defined by the screen.

18 Claims, 20 Drawing Figures

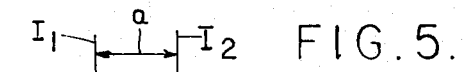
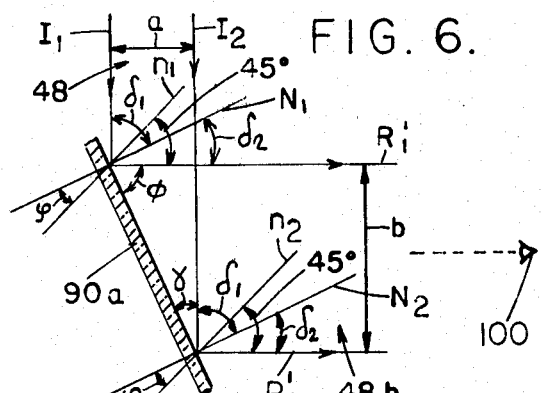
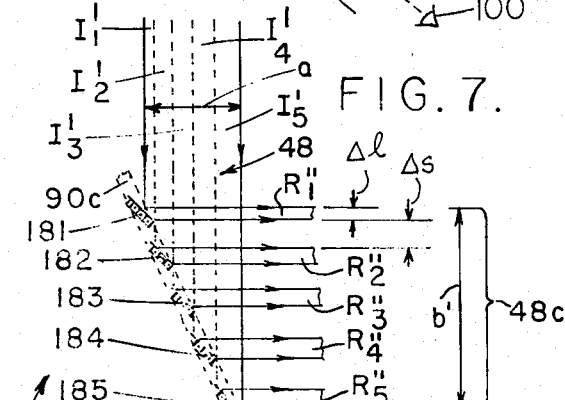
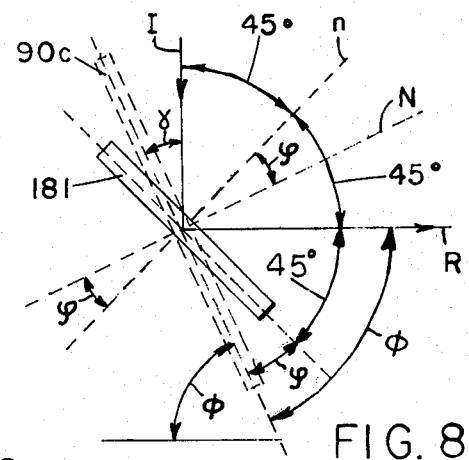
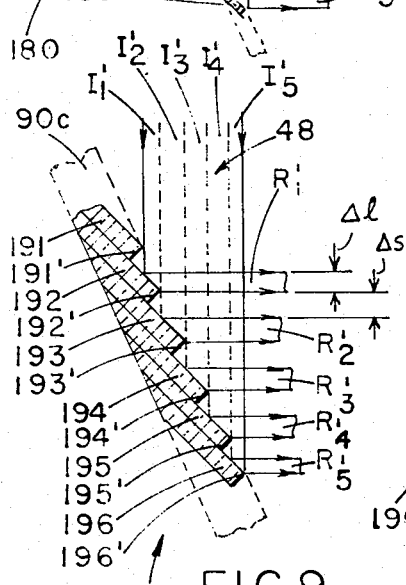
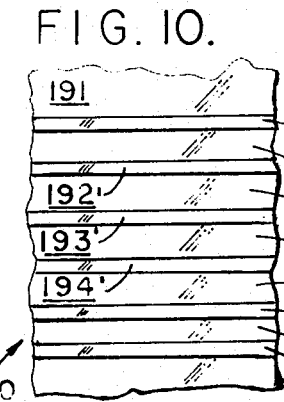
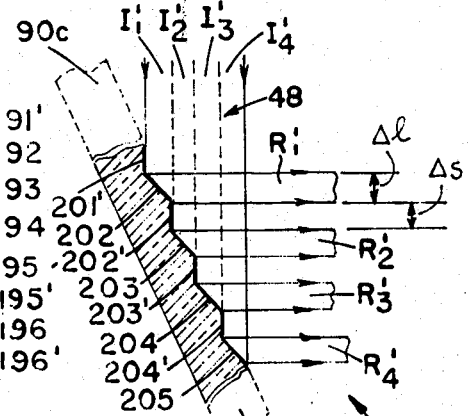
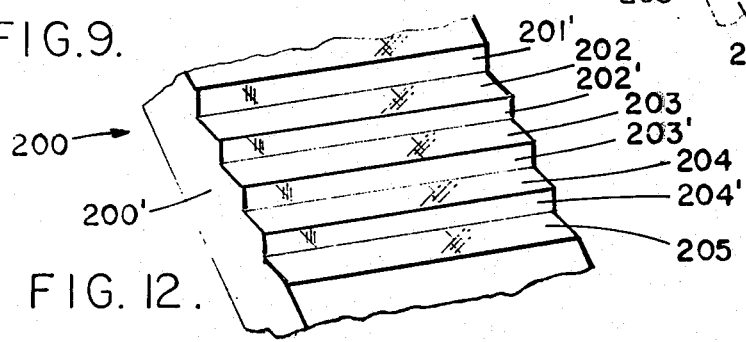

METHOD OF ENLARGING IMAGES WITHOUT LENSES AND DISPLAY DEVICE UTILIZING THE METHOD

BACKGROUND OF THE INVENTION

The present invention generally relates to a method and apparatus for enlarging images, and more particularly to a method and apparatus for enlarging images, formed in transparencies, without the use of lenses.

Various devices for viewing images are already known. In addition to projectors of various types, display devices are known which magnify, as well as reduce in size, images typically obtained from a photographic transparency. Many of the known prior art display devices, however, employ one or more lenses to obtain magnification. Firstly, the use of lenses greatly increases the cost of the display device since non-distorting lenses are generally expensive components. Secondly, unless the lenses are of very high quality, the enlarged images obtained with the known display devices include distortions of various types well known to those skilled in the art. One of the more prominent distortions deal with the spherical aberrations of the lenses. Thirdly, most display devices which enlarge images are required to have substantial depth in the direction of projection of the image. Such a requirement results in the display devices being extremely bulky and space consuming. Consequently, the known display devices have not, to date, found wide acceptance in the home for purposes of permanent displays.

Also known are viewing devices which do not utilize any lenses whatsoever but instead depend upon the luminous qualities of a point source of light. One such viewing device is disclosed in U.S. Pat. No. 3,234,675. In this patent, a point source of light is disclosed which is variably and adjustably spaced from a transparency which is interposed between the source of light and a translucent screen or viewing sheet. The principle of operation of the latter type of viewing device essentially depends on the radiating properties of light from a point source. As is well known, a light beam forming a solid angle emanating from a point source has a normal cross-sectional area which increases as the square of the distance of the area from the point light source. As with the above described embodiments, however, the depth of an enclosure defining the viewing device must be substantial relative to the area of the viewing screen in order to magnify a small transparency to an area equivalent to a desirable viewing screen. As before, the viewing device disclosed in the above mentioned patent is bulky and is not suitable for home use.

Most of the above described prior art devices, because of their bulky nature, have not been suitable for hanging on a wall. Consequently, when transparencies have been utilized, e.g., for advertising purposes, the display devices have frequently been at least partially placed in cavities or wall receptacles so that a substantial portion of the display device is positioned inside a wall in order to make the display device more aesthetic and less space consuming exteriorly of the wall. Alternately, some prior art devices have made enlargements of small transparencies having dimensions substantially equal to the dimensions of the desired viewing screen. In the latter cases, the viewing device itself offers no magnification — only providing a light source on one side of the enlarged transparency which makes the transparency viewable on the other side. These devices have necessitated the additional expense of first producing the enlarged transparencies from small transparencies. Additionally, the enlarged transparency approach has the further disadvantage that the images which are viewable in the viewing device are not readily interchangeable since for each smaller transparency which is to be viewed an enlarged transparency must first be made and placed into the viewing device.

With respect to most of the known viewing devices which magnify an image formed on a transparency, e.g., a 35 millimeter slide, these have operated on the distance-squared law of point sources, as modified by the incorporation of expensive lens systems. These devices, for reasons mentioned above, are not suitable for utilization on walls in homes, especially in small rooms, since the viewing devices project or extend substantially or excessive distances away from the wall to thereby make the viewing device aesthetically unpleasing as well as impractical in small areas.

SUMMARY OF THE INVENTION

Accordingly, it is an object of the present invention to provide a lensless method of enlarging images and display device utilizing the method which is not possessed of the above described disadvantages inherent in analogous prior art methods and devices.

Another object of the present invention is to provide a method of enlarging images which is simple to implement and a display device utilizing the method which is simple in construction and economical to manufacture.

It is still another object of the present invention to provide a display device of the type above described which magnifies an image at least along one of its planar directions and which does not utilize lenses but only reflective surfaces.

It is yet another object of the present invention to provide a display device of the type under discussion which enlarges an image along two orthogonal planar directions of an image without the utilization of lenses and which does not depend on the radiation properties of a point source of light.

It is a further object of the present invention to provide a display device which enlarges an image along two of its orthogonal planar directions but which has a depth which is substantially smaller than the height and the width of the device.

It is still a further object of the present invention to provide a display device whose width is approximately equal to the width of a mounted 35 millimeter slide transparency.

It is yet a further object of the present invention to provide a lensless enlarging display device whose width is approximately equal to the width of a transparency to be enlarged and which is suitable for hanging on a wall.

It is a still further object of the present invention to provide a wall mountable display device which enlarges a transparency and which also permits easy interchangeability of transparencies. In this manner, the images projected on a viewing screen of the display device may easily be changed by merely replacing a transparency.

An additional object of the present invention is the provision of a display device which enlarges a transparency by generating a source of substantially parallel light ray portions which are transmitted through the transparency and are reflected from a plurality of spaced reflecting surfaces onto similar reflecting surfaces and from there reflected to a viewing screen.

It is still an additional object of the present invention to provide a display device of the type under discussion which separates an image formed on a transparency into an array or matrix of spaced image portions which were originally adjacent to one another in the original image. The dissected or scattered image portions are directed onto a viewing screen for observation.

It is yet an additional object of the present invention, in connection with the last mentioned object, to disperse, diffuse or magnify the individual image portions so as to blend spaced image portions with each other prior to viewing by an observer.

In order to achieve the above objects, as well as others which will become apparent hereafter, the present invention is for a method and display device for enlarging a two-dimensional image in at least along one of its planar directions. The display device comprises light beam forming means for forming a light beam having substantially parallel light ray portions oriented in a first direction. Said light ray portions together define the image. Scattering means are provided for separating, along a direction corresponding to a planar direction of the image, said light ray portions into a plurality of light rays and for directing said light rays in spaced relation to one another in a second direction. In this manner, the dimension of the image as defined by said spaced directed light rays is greater than the corresponding dimension of the original image along said planar direction.

In accordance with a presently preferred embodiment, the image is enlarged along two planar directions, wherein first and second scattering means are provided. The first scattering means is arranged for separating the light ray portions into a plurality of first light rays along a direction corresponding to one planar direction of the image and for directing said first light rays in spaced relation to one another in a second direction. The second scattering means is arranged for separating said first light rays into a plurality of second light rays along a direction corresponding to another planar direction of the image and for directing said second light rays in spaced relationship to one another in a third direction. According to the preferred embodiment, said first, second and third directions are mutually orthogonal to each other.

In accordance with one important feature of the present invention, said scattering means each comprises a plurality of reflecting surfaces spaced along a respective direction of incident light on said scattering means. Said reflecting surfaces of each scattering means are so arranged so as to generally define a planar reflector forming a predetermined angle with said respective directions of incident light. Each of said reflecting surfaces forms an angle with said directions of incident light which is different from said predetermined angles and so selected so as to establish effective angles to reflection of said light rays with respect to each of said planar reflectors which are smaller than the effective angles of incidence of said light ray portions with respect to said respective planar reflectors when said light ray portions impinge on and said light rays reflect from said reflecting surfaces. The presently preferred reflecting surfaces are elongated, each surface being substantially parallel to the other of said reflecting surfaces forming the same planar reflector. Said second scattering means is similarly constructed to said first scattering means.

In order to achieve magnification of an image, said predetermined angles are selected to be equal to less than 45°. However, irrespective of said predetermined angles, the angles formed between each reflecting surface of the first scattering means is equal to 45° with respect to the first direction, whereas the reflecting surfaces in the second scattering means is equal to 45° with respect to said second direction.

The display device essentially scatters image portions from a smaller existing image onto a screen of greater surface area in a matrix array without magnifying each individual image portion. The present invention preferably comprises a projection screen means arranged to intercept said light rays forming the scattered image and which may include either diffusing means for diffusing said light rays or image portions or magnifying means for magnifying said light rays subsequent to scattering of the image portions in spaced relationship to one another in the matrix array.

The method of enlarging a two dimensional image at least along one of its planar directions in accordance with the present invention comprises the steps of forming a light beam consisting of substantially parallel light ray portions, said parallel light ray portions together defining the image. The light portions are separated into a plurality of light rays along a direction corresponding to a planar direction of the image. The so separated light rays are then directed in spaced relation to one another in a second direction. In this manner, the dimensions of the image defined by said directed light rays is greater than the corresponding dimensions of the original image along said planar direction.

According to the presently preferred embodiment, the method further comprises the step of either diffusing or magnifying each of said spaced light rays.

According to the preferred method, the image is enlarged along another of its planar directions, further comprising the step of separating said light rays into another plurality of light rays along a direction corresponding to another planar direction of the image. The other light rays are then directed in spaced relation to one another in a third direction, said first, second and third directions being so selected so that they are mutually orthogonal to one another.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 5 is a schematic representation of a conventional reflecting surface, showing the incident and reflected light;

FIG. 6 is a schematic representation of an ideal reflecting surface in the form of a planar reflector in accordance with the present invention, showing the angle of incidence being different than the angle of reflection;

FIG. 7 is one embodiment of a practical realization of the reflecting surface as shown in FIG. 6, showing an apparent planar reflector consisting of a plurality of spaced and parallel reflecting surfaces which separate a light beam and direct the resulting parallel rays in spaced relation to one another;

FIG. 8 is a schematic representation of one of the reflecting surfaces shown in FIG. 7 to illustrate the principle upon which the reflecting surface shown in FIG. 6 operates;

FIG. 9 illustrates a side elevational view of another practical realization of the planar reflector shown in FIG. 6;

FIG. 10 is a front elevational view of the embodiment shown in FIG. 9;

FIG. 11 is a third embodiment of a practical realization of the planar reflector shown in FIG. 6, wherein the reflecting surfaces are integrally constructed or formed in a unitary planar object;

FIG. 12 is a perspective view of the embodiment illustrated in FIG. 11;

DETAILED DESCRIPTION OF THE PREFERRED EMBODIMENTS

Figure 1:
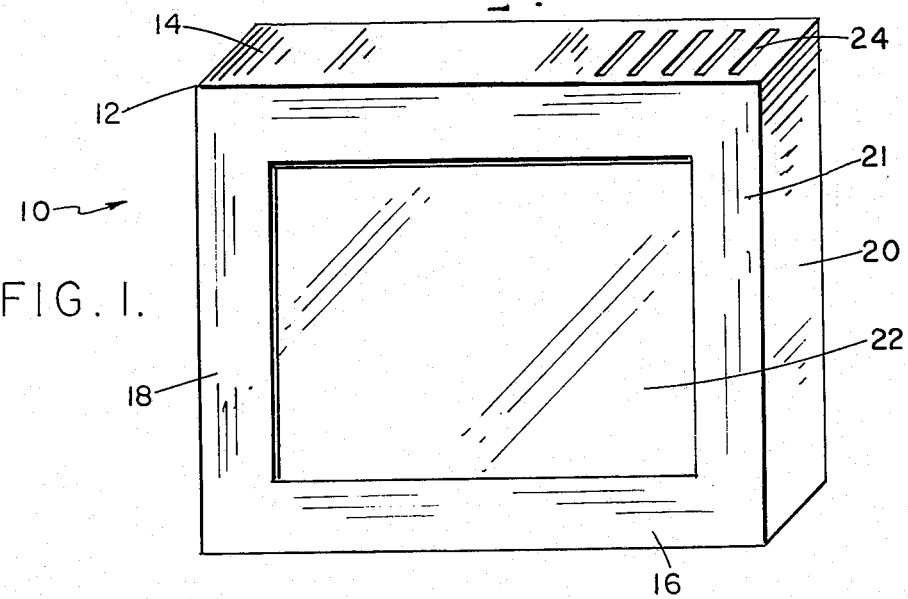
FIG. 1 is a perspective view of a display device in accordance with the present invention.

The present invention will now be described in detail with reference to the FIGURES, wherein similar or identical parts have been designated by the same reference numerals throughout. Referring first to FIG. 1, an enlarging display device 10 is illustrated as having a substantially rectangular enclosure 12 which comprises a top frame wall 14, a bottom frame wall 16, a left side frame wall 18 and a right side frame wall 20. Each of the aforementioned walls is generally in the form of an elongated flat rectangular board — the length of the top and bottom walls 14, 16 determining the width of the display device 10 while the length of the left and right walls 18, 20 determine the height of the display device. Connected to each of the above described walls is a rectangular front wall 21, which is provided centrally therein with a rectangular cutout adapted to receive a viewing screen 22, as to be more fully described hereafter, and a rear wall 23. The walls described thus far together with the viewing screen 22 and the rear wall 23, best seen in FIGS. 3 and 4, together define the enclosure 12. Air cooling or ventilating slots 24 are provided in the top frame wall 14 for reasons which will become apparent hereafter.

The present invention will be described in connection with an enlarging display device which enlarges an image along two orthogonal directions of the image. More particularly, the present invention will be described in connection with a device which is particularly suitable for enlarging transparencies in the form of 35 millimeter slides. It will be obvious from the description that follows, however, that the present invention may equally be utilized to enlarge an image along only one of its planar directions.

A principle of operation of the display device 10, which will be fully described hereafter, permits the depth 15 of the display device 10 to be substantially less than either the height of the display device, as defined by the left and right walls 18, 20, or the width, as defined by its top and bottom walls 14, 16. More particularly, the present invention permits the construction of a display device which has a depth substantially equal to the smallest planar dimension of either a transparency or of the mount in which the transparency is mounted. Thus, although the present invention is described in connection with a display device which enlarges a mounted 35 millimeter slide transparency, it should be pointed out that the present invention may be utilized to enlarge any other transparency whose dimensions may be greater or smaller than those associated with 35 millimeter slide transparencies. In the case of any transparency, mounted or unmounted, the depth of the display device may be made to substantially correspond to the smallest planar dimension of the ummounted or mounted transparency.

The detailed description that follows will relate to a display device which is suitable for use with 35 millimeter transparencies which are mounted in a standard cardboard frame or mount of approximately 2 by 2 inches square—this being a common format in wide spread use. With such format, the transparency embodying the image is mounted interiorly of the cardboard mount—the actual transparency being approximately 0.9 by 1.35 inches. Accordingly, the effective area of the actual transparency is just a little over ¼ of the effective area defined by the outside cardboard mount dimensions in which the transparency is mounted. Transparencies, may, as will become clear hereafter, be utilized without mounts — the principle of operation being the same in both cases, as to be described. Slight modifications of the display device structure when used with unmounted transparencies will be pointed out and described in the description that follows.

Figure 2:
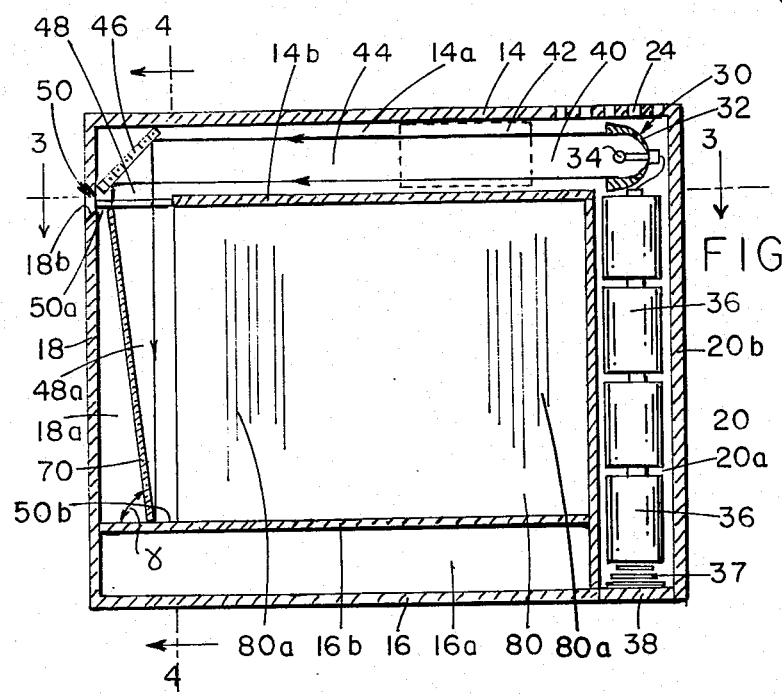
FIG. 2 is a front elevational cross-section of the display device taken along line 2—2 of FIG. 4, essentially showing the front of the device with the front covering walls and viewing screen removed.
Figure 3:
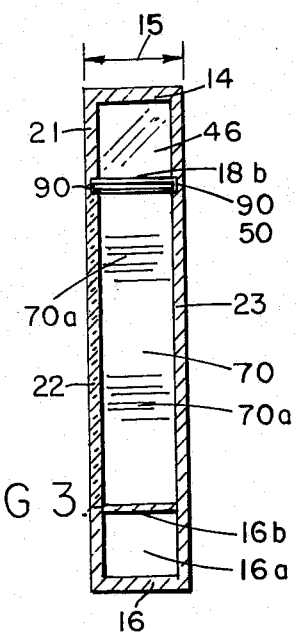
FIG. 3 is a cross-sectional view taken along line 3—3 of FIG. 2.
Figure 4:
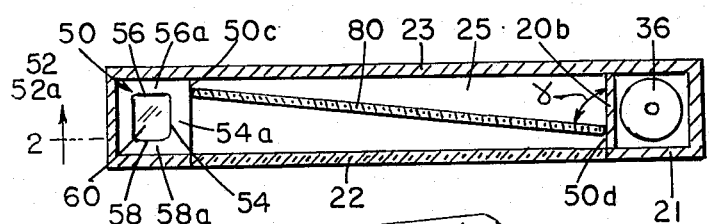
FIG. 4 is a cross-section taken along the line 4—4 of FIG. 2.

Referring to FIGS. 2–4, the display device 10 has a bottom inner wall 16b which, together with the bottom wall 16, defines a lower elongated compartment or chamber 16a which extends almost across the entire width of the display device 10. A right inner wall 20b is provided which, together with the right wall 20, forms an elongated compartment or chamber 20a which extends almost the entire height of the display device. Similarly, the top inner wall 14b is provided which, together with the top wall 14, form a top elongated compartment or chamber 14a which extends the entire width of the enclosure 10. No inner wall is disposed adjacent the left wall 18 and, consequently, no left chamber comparable to the aforementioned chambers is formed. Instead, the space 18a adjacent interiorly of the left wall 18 communicates with a central chamber 25 best seen in FIG. 4.

The bottom chamber 16a is shown to be isolated from the other chambers while the right chamber 20a is in communication with the top chamber 14a in the upper right corner of the enclosure 10 as viewed in FIG. 2. Also, the top chamber 14a is shown to be in communication with the region adjacent the left wall 18 as well as with the central chamber 25 at the upper left corner of the enclosure as viewed in FIG. 2. For reasons which will become apparent hereafter, it is only important for the present invention that the top chamber 14a, the region adjacent the left wall 18 and the central chamber 25 be in communication with each other whereby rays of light may pass or be transmitted from the top chamber 14a into the central chamber 25. When the display device is constructed as to be described, the specific communicative relationships between the right chamber 20a, the top chamber 14a and the bottom chamber 16a are not critical.

Positioned in the right chamber 20a are a plurality of batteries 36 arranged in series in a conventional manner. The negative pole of the series connected batteries is shown supported on a conductive spring 37 which is connected by a suitable lead (not shown) to a light assembly 30, advantageously through an on-off switch (not shown), in a conventional manner. The positive pole of the series connected batteries 36 is shown connected to one terminal of the light assembly 30. The bottom wall 16 is advantageously provided with a removable lid 38 which permits access to the right chamber 20a for the purpose of inserting or removing the batteries 36 as required. The electrical circuit formed by the batteries 36 and the light assembly 30 is not unlike that formed in a conventional flashlight. The operation of the simple electrical circuit formed thereby is readily known to those skilled in the art and need not be described in detail.

The light assembly 30 comprises a reflector 32 and a bulb 34. The light assembly 30 is so selected so that when it is energized it generates a substantially parallel beam of light. Any suitable light assembly 30 which forms such a parallel beam may be used. For example, the reflector 32 may be selected to parabolic in configuration. The bulb 34 is advantageously selected to be one having a small filament which approximates a point source of light. The bulb 34 is then positioned at the focal point of the reflector 32. Although a light assembly having such construction will generate a substantially parallel beam of light 40, any other suitable and conventional light assembly may be utilized.

The slots 24 are advantageously disposed above the light assembly 30 to permit the air heated up by the bulb 34 to escape by convection through the slots. In this manner, a continuous flow of heated air leaves through the ventilating slots 24. Such air flow not only increases the life of the bulb 34 but more importantly it prevents excessive heat build up in remote parts of the display device 10 for reasons which will become apparent hereafter.

Although the light assembly 30 has been described as generating a substantially parallel beam 40, a collimator unit 42 may be disposed in the upper or top chamber 14a for producing a substantially parallel beam 44 when the beam 40 is not in fact parallel. The collimator 42 has been shown in dashed outlines — the details of such a unit being well known to those skilled in the optical arts. Clearly, the collimator 42 is optional when the beam 40 approximates the desired substantially parallel beam.

As should be clear from FIG. 2, the spaces between the respective inner and outer walls forming each of the above described chambers 16a, 14a and 20a are substantially equal and approximate the width of the legs of the front wall 21. However, this showing is merely illustrative and does not form a critical feature of the present invention, except as to be described specifically hereafter.

The beam 40, or the beam 44, is transmitted in a direction substantially parallel to the elongated top chamber 14a. A mirror 46 is positioned in the top left hand corner of the display device and arranged at a 45° angle with respect to the horizontal or top inner wall 14b. The function of the mirror 46 is to reflect the beam 40 or 44 and deflect it in a downward direction substantially parallel to the left wall 18. This downward direction adjacent the left wall 18 will be referred to in the specification, as well as in the claims, as a first direction. The beam, subsequent to reflection in the mirror 46, is designated by the reference numeral 48.

Disposed directly beneath the mirror 46 is a 35 millimeter slide 50 which is removable from the display device 10 through a slot 18b formed in the left wall 18. The beam 48 is transmitted through the transparent portion 60 of the slide 50, as best seen in FIGS. 2 and 4. The slide 50 may be supported in the position shown in any conventional manner, e.g. grooves 90 in the front wall 21 and the rear wall 23, best shown in FIG. 3. The slot 18b is advantageously made large enough so that a person can extend the tips of his fingers through the slot and grip the slide 50. As should be clear, the purpose of positioning the light assembly 30 in the top right corner of the display device 10, while placing the slide 50 on the top left side of the display is to limit the amount of heat to which the transparency is exposed. By expelling most of the hot air through the slots 24 on the right side of the display, heat accumulation is prevented on the left side of the display. Warping or damage of the transparent portion 60 is thereby prevented.

As described above, a 35 millimeter slide 50 has a transparent portion 60 approximately 0.9 by 1.35 inches. The transparent portion 60 will be described as having a top portion or edge 52, a bottom portion or edge 54, and two side portions or edges 56 and 58. The mount, which has been described above as having planar dimensions of 2 by 2 inches includes a top portion 52a, a bottom portion 54a and side portions 56a and 58a. When inserted in the display device 10, the slide 50 is shown to extend between the left wall 18 and the left most edge of the top inner wall 14b to thereby substantially close the top chamber 14a in the upper left portion of the display device 10.

Disposed directly beneath the slide 50 is a first planar reflector 70 in accordance with the present invention, shown schematically. The specific construction of the planar reflector 70 will be more specifically described in connection with FIGS. 6–12. The planar reflector 70 is generally in the form of an elongated member, as shown in FIGS. 2 and 3, and is inclined in such a manner so that the top edge thereof is substantially coextensive with the top edge 52 of the slide while the lower edge of the planar reflector 70 is vertically aligned with the bottom edge 54 of the slide. Accordingly, an offset distance 50a is formed between the left wall 18 and the top edge of the planar reflector 70 while a lower offset distance 50b is formed between the lower edge of the planar reflector 70 and the vertical projection of the left most edge of the top inner wall 14b. The upper and inner offset distances 50a and 50b respectively correspond to the dimensions of the mounting portions 52a and 54a. Accordingly, the planar reflector 70 is fully contained in a hypothetical enclosure defined by the downward projections of the transparent portion 60 so that the beam 48, subsequent to passing through the transparent portion 60, impinges on the full planar extent of the reflector 70.

Although the construction of the planar reflector 70 will be more fully described hereafter, it suffices at this point to mention that the parallel light which emanates in a downward or first direction is reflected by the planar reflector 70 in a substantially horizontal or second direction parallel to the top and bottom walls 14, 16 into the central chamber 25.

A second planar reflector 80 is positioned in the central chamber 25 whose basic construction is similar to that of the first planar reflector 70. The second planar reflector 80 is also inclined in the enclosure, as best seen in FIG. 4, and is offset from the rear wall 23 and from the viewing screen 22 by distances 50c and 50d respectively. The offset distance 50c corresponds to the dimension of the mounting portion 56a while the offset distance 50d corresponds to the dimension of the mounting portion 58a. As with the first planar reflector 70, the second planar reflector 80 is so arranged so that all the light which emanates from the first planar reflector 70 impinges over the entire reflecting surface of the second planar reflector 80.

The direction of light subsequent to reflection from the first planar reflector 70 will be designated in the specification as well as in the claims as a second direction — this second direction being substantially parallel to the top and bottom walls 14, 16.

As with the first planar reflector 70, the second planar reflector 80 is so constructed so that light which is transmitted in a second direction towards the second planar reflector 80 is transmitted by the latter in a third direction which is substantially normal to the viewing screen 22. The light emanating from the second planar reflector 80 impinges on the viewing screen 22 and forms an image thereon which may be viewed over an effective surface area which is substantially greater than the surface area of the original transparent portion 60. As will be explained hereafter, each of the planar reflectors enlarges the image along one of its orthogonal directions — the planar reflector 70 enlarging the image along its sides 56, 58 while the planar reflector 80 enlarges the image along its top and bottom sides 52, 54.

Before describing the specific construction of the planar reflectors which permit enlargement as suggested above, some other brief observations will be made concerning the display device 10. Firstly, the thicknesses of the walls have been somewhat exaggerated for clarity of illustration. Further, the bottom chamber 16a may be conveniently utilized for storage of slides. However, it should be clear that the batteries 36 can equally be housed in the lower chamber 16a instead of in the right chamber 20a. Optionally, batteries may be housed in both chambers 20a, 16a to further increase the intensity or the life span of the batteries.

The nature of the planar reflectors which makes the above described operation of the display device 10 possible will now be described. In FIG. 5, a conventional planar reflector 90 is shown. Such conventional reflectors are well known and include mirrors as well as other highly polished surfaces. All conventional planar reflectors follow the well known optical law of reflection which, simply stated, is that the angle of incidence on a reflector is equal to the angle of reflection from the reflector. IN FIG. 5, an incident beam 48 is shown as having light ray portion $I_1$ and $I_2$. The beam has a cross section designated by the letter "$a$". A Normal $N_1$ is shown at the point at which the light ray portion $I_1$ is incident on the reflector 90. The angle formed between the light ray portion $I_1$ and the normal $N_1$ is $\alpha_1$. The reflected light ray portion associated with the incident light ray portion $I_1$ is designated by $R_1$, which emanates from the reflector 90 at an angle $\beta_1$ with reference to the normal. The law of reflection defines the angles $\alpha_1$ and $\beta_1$ as being equal when a conventional smooth planar reflector is utilized. Similarly, the incident light ray portion $I_2$ is reflected as light ray portion $R_2$ so that the angles $\alpha_2$ and $\beta_2$ are equal with reference to the normal $N_2$. The reflected light ray portions $R_1$ and $R_2$ together define a beam 48a. With conventional planar reflectors 90, the cross section $a$ of the reflected beam 48a is equal to the cross section $a$ of the incident beam 48. Thus, an observer designated by the reference numeral 100, viewing the beam along a direction parallel to the reflected beam 48a, observes beam and or image dimensions which correspond to those of the incident beam 48. The only function which a conventional planar reflector 90 can perform is to reflect or change the direction of an incident beam in accordance with the above described law of reflection without magnification.

An ideal magnifying planar reflector 90a is illustrated schematically in FIG. 6. The reflector 90a is generally planar in configuration and defines an angle $\Phi$ with respect to a direction normal to the direction of the incident beam 48.

As in FIG. 5, the incident beam 48 in FIG. 6 comprises incident light ray portions $I_1$ and $I_2$. The normals $N_1$ and $N_2$ correspond to the normals shown in FIG. 5 and comprise normals perpendicular to the general extent of the planar reflector 90a.

An important feature of the present invention is the provision of a planar reflector whose apparent angles of incidence and reflection are not equal to each other with respect to normals of the general planar extent of the reflector. Such an idealized planar reflector 90a illustrates the principle. The normal $N_1$ represents a normal of the general extent of the planar reflector 90a. For example, the incident light ray portion $I_1$ defines an angle of incidence $\delta_1$ with respect to the normal $N_1$. However, the angle of reflection in $\delta_2$ of the reflected light ray portion $R_1'$ is smaller than $\delta_1$. The planar reflector 90a similarly reflects the light ray portion $I_2$ in accordance with this non-conventional mode of reflection. The resulting reflected beam 48b defined by the end light ray portions $R_1'$ and $R_2'$ has a cross section designated by the letter "b" as it appears to an observer 100 observing the reflected beam along a direction substantially parallel thereto. The dimension b is greater, in the illustrated example, than the dimension a. Consequently, magnification of the incident beam is obtained. Of course, such ideal magnification defies the basic optic law of reflection since, as suggested above, the angle of incidence and of reflection are not equal with respect to the normals to the general extent of the ideal planar reflector 90a.

The extent of magnification, with an ideal planar reflector 90a can be defined by the relationship: Magnification = tan $\Phi$. For example, for magnification of six, i.e. where the dimension b is 6 times greater than the dimension a, the angle $\Phi$ must be selected to be approximately equal to 80°. When $\Phi$ is equal to 45°, there is no magnification and the cross sections a and b become equal to each other. Thus, $\Phi$ equal to 45° is a limiting condition, and to obtain magnification $\Phi$ must be greater than 45°. However, because the magnitude of magnification increases tangentially with the angle $\Phi$, magnification increases very rapidly above 80° thereof and the positioning of the reflector 90a becomes somewhat critical. Theoretically infinite magnification is obtained for $\Phi$ equal to 90° — this being an impractical upper limiting case.

Although the angle of incidence and reflection are not equal to each other with respect to the normals $N_1$ and $N_2$ in FIG. 6, a normal $n_1$ can be defined with respect to the incident light ray portion $I_1$ and reflected light ray portion $R_1'$ such that the angles of incidence and of reflection are equal. In the example of FIG. 6, where the incident and reflected light ray portions are 90° apart, a normal $n_1$ can be selected which is angularly displaced 45° with respect to both the light ray portions $I_1$ and $R_1'$. Similarly, a normal $n_2$ can be selected with respect to light ray portions $I_2$ and $R_2'$ which defines equal angles of incidence and reflection of 45°. Herein lies an important feature of the present invention, namely that the ideal planar reflector 90a must have the property that it operate on each incident light ray portion in such a manner so as to reflect the respective light ray portion in accordance with the optical law of reflection with respect to a normal which is angularly displaced by an angle $\phi$ from the apparent normals of the general extent of the ideal planar reflector 90a. Yet, although each element of the ideal planar reflector 90a reflects a respective light ray portion in accordance with the law of optical reflection, the elemental reflecting surfaces are so disposed relative to each other so as to define a general planar extent of the ideal planar reflector 90a, the reflector 90a defining normals which are angularly displaced from the normals of the elemental reflecting surfaces.

A practical realization of the ideal planar reflector 90a of FIG. 6 is shown in FIG. 7 and designated by the reference numeral 180. The planar reflector 180 comprises a series of substantially parallel spaced reflecting surfaces 181–185. The reflecting surfaces are spaced from each other in a generally planar extent which is shown dashed and designated by the reference numeral 90c. The apparent planar reflector 90c represents an outline of the ideal planar reflector 90a of FIG. 6.

Referring to FIG. 8, an enlarged view of the elemental reflecting surface 181 is shown and its relationship to the apparent planar reflector 90c is depicted. As described in connection with FIG. 6, the general extent of the apparent planar reflector 90c has a normal N. However, an incident light ray portion I, incident on the apparent planar reflector 90c, is not reflected at an angle of reflection equal to its angle of incidence relative to the normal N. The reflecting surface 181 is so arranged so that the normal n of the elemental reflecting surface 181 defines the incident and reflective angles in accordance with the law of reflection. In accordance with the presently preferred embodiment of the invention, the angles of incidence and reflection are selected to be equal to 45°. However, this angle is merely illustrative and not limiting of the present invention — any other incident and reflective angles relative to the normal n may be selected where more desirable, with varying degrees of advantage. The angles of incidence and of reflection to be described in connection with the elemental reflecting surfaces of the presently preferred embodiments to be described hereafter shall be made equal to 45°.

An examination of FIG. 8 reveals that the angle $\phi$, representing the actual angular displacement between the normals n and N or displacement between the plane defined by the reflector 90c and the plane defined by the reflecting surface 181, is related to the angle $\Phi$ by the following relationship: $\phi = \Phi - 45°$. This relationship is valid for angles of $\Phi$ equal to or greater than 45°.

The approach, then, of preparing a suitable planar reflector 90c which approximates the ideal planar reflector 90a is to first determine how much magnification is desired. The amount of magnification determines the angle $\Phi$, which can easily be found from the relationship $$\Phi = \tan^{-1} m$$

where m is the amount of magnification. Once the angle $\Phi$ has been determined, the general orientations of the reflecting surfaces, or the angle $\phi$ can be easily found from the above relationship between $\phi$ and $\Phi$.

Referring again to FIG. 7, the general principle of operation is illustrated. The incident light beam 48 comprises parallel light beam portions $I_1'-I_5'$. The light beam portion $I_1'$ is incident on the reflecting surface 181 and is reflected, as described in connection with FIG. 8, at an angle 90° from the incident beam portion. The reflected light ray is represented by $R_1''$. Similarly, the incident light ray portion $I_2'$ is incident only on the reflecting surface 182 and is reflected at 90° into light ray $R_2''$. By selecting a reflector 180 whose projection in a plane normal to the incident beam 48 is equal to the width of the beam 48, each of the light ray portions $I_1'-I_5'$ is incident on a respective reflecting surface 181–185. The cross section of each of the reflected light rays $R_1''-R_5''$ is equal to $\Delta l$, which is substantially equal to the cross section of each of the individual incident light ray portions $I'_1-I'_5$.

An important feature of the present invention is that the light ray portions $R_1''-R_5''$ are each spaced from each other distances designated by $\Delta s$ — this being the distance or spacing of the reflecting surfaces 181-185 from each other along the direction substantially parallel to the incident light beam 48. The actual reflected beam 48c has a cross section "b" which is greater than the cross section $a$ of the incident beam 48. As described in connection with FIG. 6, this represents an enlargement of the original incident beam. However, it should be noted that the resulting magnification is not pure magnification as suggested in the discussion with the reference to FIG. 6. The resulting magnification may be described as dispersive magnification whereby originally adjacent light ray portions $I_1'-I_5'$ are separated or dispersed relative to each other — the actual reflected beam 48c effectively representing an image which covers an area greater than that covered by the original incident beam 48. In this sense, magnification is obtained. The distortions resulting from the separation or dispersion of the light ray portions of the original image and the means for minimizing the same will be discussed hereafter.

The planar reflector 180 enlarges or magnifies the light beam 48 in one planar direction, namely in the direction normal to the direction of the beam 48. To achieve such result, each of the reflecting surfaces 181-185 may comprise an elongated reflector whose length is substantially equal to the depth of the beam 48. Thus, the beam 48, termed to be incident from a first direction, is reflected and simultaneously effectively enlarged when the spaced reflected rays $R_1''-R_4''$ are reflected in a second direction normal to the first direction.

The manner of selecting the sizes or reflecting areas of the planar reflectors 181-185, as well as the manner of selecting the spacing therebetween will be described hereafter.

In FIG. 9, another embodiment of the planar reflector 90c is illustrated. Here, the planar reflector 190 comprises a series of abutting or adjacent elements — the elements being so shifted relative to one another so as to generate a series of reflecting surfaces 191-196 along the direction parallel to the incident beam 48. The thicknesses 191'-196' of the various elements determines the spacing $\Delta s$, while the relative shift between the elements determines the effective reflecting surface areas for reflecting beams $R_1'-R_5'$ each with cross sections of $\Delta l$. The planar reflector 190 separates or disperses the beam 48 in a manner similar to that described in connection with FIG. 7.

FIG. 10 represents a front elevational view of the planar reflector 190 shown in FIG. 9. The elongated nature of each of the reflecting surfaces 191-196 is shown. The length of each of the reflecting surfaces is selected to correspond to the depth of the incident beam 48. Accordingly, each of the reflected light rays $R_1'-R_5'$ is in the nature of a relatively flat strip of light which is reflected in a horizontal plane when the incident light ray portions $I_1'-I_5'$ are incidently directed in a first downward direction.

In FIGS. 11 and 12, a third embodiment of the apparent planar reflector 90c is shown to comprise an actual planar reflector 200 in the nature of a solid or integral member 200'. Formed in one surface of the planar member 200' are a series of angularly disposed parallel reflecting surfaces 202-205 which are each separated or spaced from each other by spacing portions 201'-204' respectively. The actual planar reflector 200 operates on the light beam 48 in an identical manner as that described in connection with actual planar reflectors 180 and 190.

Referring to FIG. 8, each of the reflecting surfaces described in connection with the planar reflectors 180, 190 and 200 have normals which are angularly displaced from the normals of the extent of the apparent planar reflectors 90c by an angle $\phi$ defined above. Thus, irrespective of an angle $\gamma$ between the apparent planar reflector 90c and the incident beam 48 direction, the reflecting surfaces are always angularly selected or positioned at 45° angles relative to the incident beam. The angle $\gamma$ is related to the angle $\Phi$ by the following relationship: $\gamma = 90° - \Phi$. Once the desired magnification and the angle $\Phi$ have been selected, this fixes the angle $\phi$ between the normals of each of the reflecting surfaces and the normals of the apparent planar reflectors 90c such that when the planar reflectors 90c are positioned at the angle $\Phi$ with respect to the horizontal, the normals of each of the reflecting surfaces will be disposed at an angle 45° with respect to the horizontal. In this connection, attention is directed to FIG. 8.

Several observations may be made at this point concerning the actual planar reflectors 180, 190 and 200. Although the actual planar reflectors are formed from elements having finite thicknesses, the reflecting surfaces are advantageously so prepared so that reflection takes place at the incident surfaces of the respective reflecting surfaces. In other words, refraction, transmission and multiple reflections through the elemental surfaces are to be avoided to minimize distortion and to maximize the efficiency or brilliance of the resulting enlarged images, as will become apparent hereafter. In order to insure reflection at the incident surfaces, any conventional method may be used. For example, the incident surfaces of each of the elemental reflecting elements may be coated with an opaque reflecting material such as silvered paint. Alternately, metallic materials may be deposited thereon by conventional deposition processes. Consequently, reflection from the surfaces takes place as illustrated in FIGS. 7, 9 and 11. This represents optimum efficiency since all the incident light is reflected in the desired direction without any dispersive or transmissive losses. Therefore, the efficiency of the actual planar reflectors in accordance with the present invention approaches the reflective efficiencies obtainable with high grade reflectors.

Figure 13:
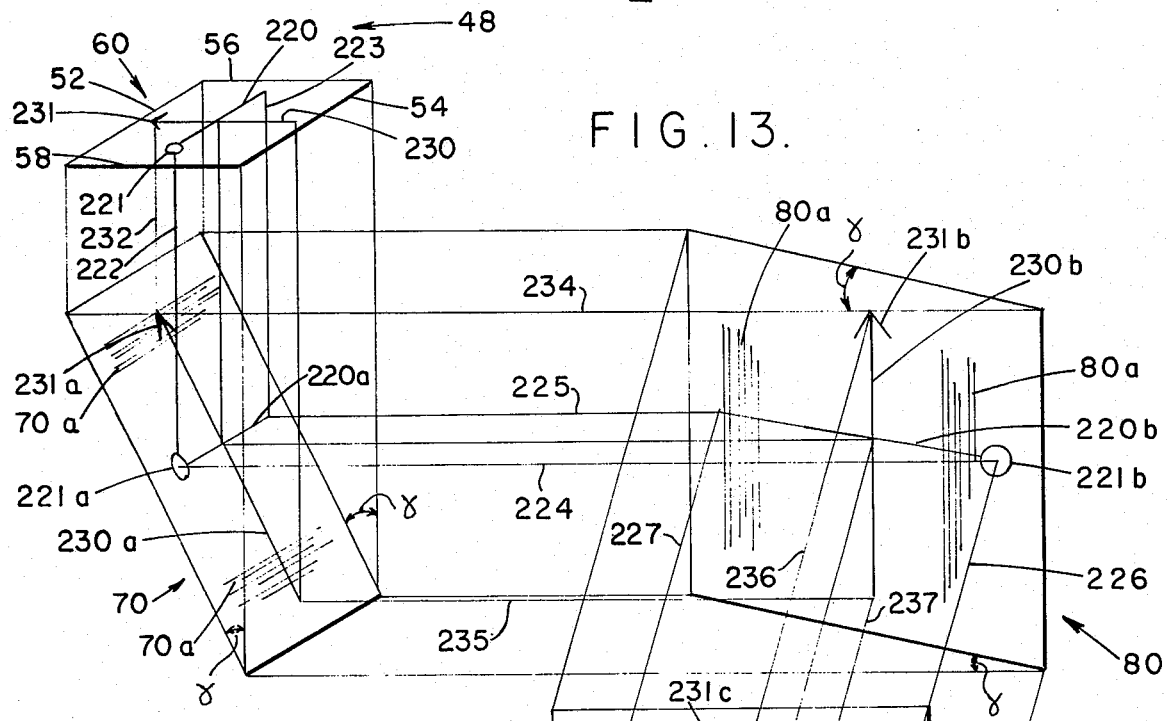
FIG. 13 is a schematic representation of the method and principle of operation incorporated in the display device of FIG. 1, showing the progression of light rays in the device to produce an enlarged image.

Referring to FIG. 13, the principle of operation of a display device utilizing actual planar reflectors such as 180, 190 or 200, will now be described. The transparent portion 60 of a slide 50 is shown to have recorded thereon information in the form of a horizontal line 220 with a circle 221 at one end thereof and a vertical line 230 with an arrow head 231 at one end thereof. The top and bottom edges 52, 54 and the side edges 56, 58 correspond to those edges of the slide shown in FIG. 4. The parallel light beam 48, as viewed in FIGS. 2 and 13, is generally directed in a downward or first direction. The first planar reflector, having reflecting surfaces 70a, shown schematically, is so inclined so that a horizontal projection thereof has a dimension substantially equal to that between the top and bottom edges 52, 54 of the transparent portion 60. Consequently, every light ray portion of the light beam 48 which is downwardly directed is intercepted by at least a portion of the planar reflector 70. The width of the planar reflector 70 is substantially equal to the width of the transparent portion 60 as defined by the distance between the side edges 56 and 58. Thus, each of the reflecting surfaces 70a, as described in connection with FIGS. 7–12, comprises a reflective surface having a length equal to the width of the reflector 70.

The second reflector 80 is positioned in a vertical plane and so inclined so that a projection thereof on the first planar reflector 70 is substantially equal to the width of the latter. The height of the planar reflector 80 is substantially equal to the height of a vertical projection of the first planar reflector 70. Accordingly, each light ray reflected from the first planar reflector 70 in a horizontal direction is intercepted by the second planar reflector 80.

While the reflecting surfaces 70a of the first planar reflector 70 are horizontally disposed, the reflecting surfaces 80a in the second planar reflector are vertically disposed. Otherwise, the construction of the first and second planar reflectors may be identical. Alternately, different embodiments of the planar reflectors may be utilized for the first and second planar reflectors.

The reflecting surfaces of each of the planar reflectors 70, 80 are so disposed, as described above, so that the angles included between the incident and reflected light beams are substantially equal to 90°. Consequently, light beams incident from a first direction onto the first planar reflector 70 are reflected in a second direction normal to the first direction towards the second planar reflector 80. Similarly, incident beams along the second direction incident on the second planar reflector 80 are reflected in a third direction normal to the first and second directions. The viewing screen 22 is arranged normal to the third direction to intercept the light rays emanating from the second planar reflector. The dimensions of the viewing screen, as well as the position of the latter, are selected so that every light ray which is reflected from the second planar reflector 80 is intercepted by the viewing screen. Stated differently, the dimensions and position of the viewing screen 22 are selected to coincide with a vertical projection of the second planar reflector 80 in a plane substantially normal to the third direction.

The ray optics which describe the manner in which the image contained in the transparent portion 60 is transmitted and enlarged onto the viewing screen 22 is shown in FIG. 13. It will be noted, for example, that the first planar reflector 70 enlarges the image contained in the transparency only along one planar direction thereof, namely the planar direction between the top and bottom edges 52, 54. Therefore, it will be noted that the first planar reflector 70 enlarges a line 230 and an arrowhead 31 and corresponding planar dimensions of the circle 221 in the direction of the line 230, but does not enlarge the line 220. The line 220a is equal in length to the line 220. On the other hand, the line 230a is an elongated version of the line 230.

The second planar reflector 80 enlarges the image in a second planar direction which is orthogonal or normal to the first planar direction. Thus, the line 230b has the same vertical components as the line 230a. However, the line 220a is enlarged by the reflector 80 into the line 220b. At the second reflector 80, both lines as well as the arrowhead 231 and the circle 221 have been enlarged.

The enlarged line 230b is transmitted onto the viewing screen 22 as line 230c while the line 220b is transmitted as line 220c. Various light rays tracing out the images progressively are illustrated and given the same reference numbers but different letter designations at different stages of projection, and are self explanatory.

The lines 220c and 230c are shown solid in FIG. 13. This is only for illustrative purposes — such solid lines not being achievable with practical realizations of the planar reflectors as described in FIGS. 7–12. Only an ideal planar reflector 90a as shown in FIG. 6 could achieve such result.

Figure 14:
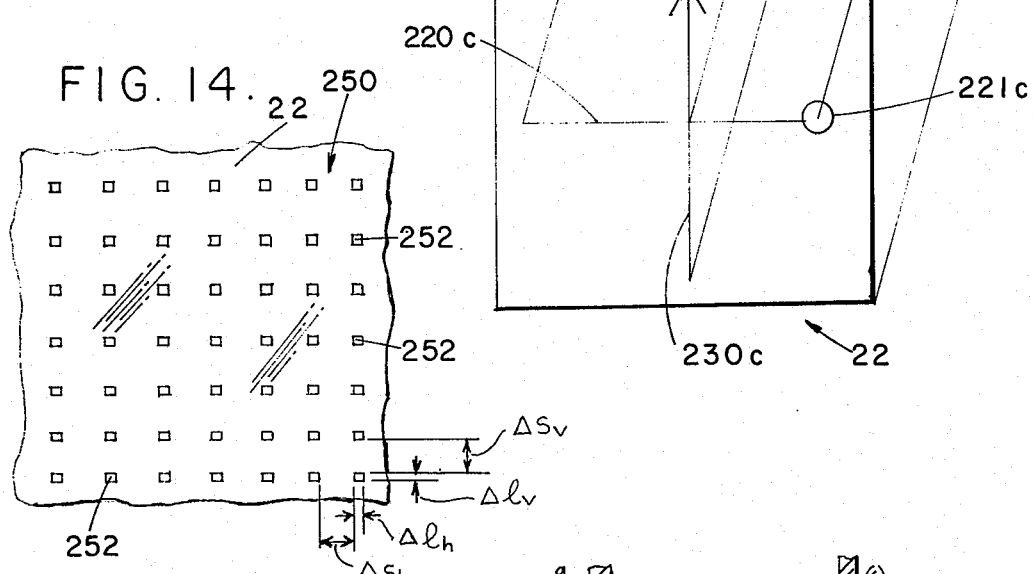
FIG. 14 illustrates a magnified portion of a viewing screen of the display device of FIG. 1, showing the spaced relationship of adjacent image portions when the display device enlarges an image.

To illustrate the type of image which is obtainable with the present invention, reference is had to FIG. 14. For purposes of facilitating the explanation, it will be assumed that the slide transparent portion 60 contains no information and is overexposed so that a uniform light beam 48 is transmitted in the first direction towards the first planar reflector 70. The image which is formed on the viewing screen 22 is in the form of a mosaic or matrix array 250 comprising image portions 252 substantially equally spaced from each other — each being substantially in the form of a square. Of course, when a transparent portion 60 includes information in the form of an image, the image portions 252 will not be of uniform intensity but will be of intensities and colorations corresponding to those portions of the slide transparency which the image portion 252 represents.

As described in connection with FIG. 7, and as illustrated in FIGS. 7, 9 and 11, each of the reflecting surfaces is capable of separating an originally single beam of adjacent light ray portions into a plurality of parallel, spaced light rays. As above described, the first planar reflector 70 separates the adjacent vertical light ray portions along one of its planar directions. The resulting reflected light rays are in the form of spaced horizontal light strips spaced from each other distances equal to $\Delta s$. In FIG. 14, this separation is represented by the horizontal rows of image portions 252 — the spacing therebetween being designated by $\Delta s_r$. Each of the light ray portions has a height of $\Delta l_r$ — this corresponding to the dimensions $\Delta l$ in FIGS. 7, 9 and 11.

The second planar reflector 80 separates or disperses the horizontal light strips reflected from the reflector 70 in the similar manner, but in a direction orthogonal to the direction of enlargement or magnification at the first reflector. In FIG. 14, dispersion or magnification by the second planar reflector 80 is represented by the spaced vertical columns of image portions 252. The columns are spaced from each other distances $\Delta s_h$ and the image portions have widths of $\Delta l_h$. The dimensions $\Delta s_r$ and $\Delta s_h$ are advantageously selected to be equal to each other as are the dimensions $\Delta l_r$ and $\Delta l_h$. In this manner, a square array or mosaic is obtained. It should also be pointed out that by assuring equal dispersions by the reflectors 70 and 80, the image is magnified or enlarged linearly and equally in both the orthogonal directions so that no distortions are obtained in one direction relative to the other and the image is equally enlarged in both directions.

Since only a simple reflection is effected by the reflecting surfaces 70a, 80a in FIG. 13, it should be clear that each of the image portions 252 itself is not magnified but corresponds to the original dimensions of the corresponding image portions of the slide transparency 60. If M represents one orthogonal dimension of the original image, and L represents the corresponding enlarged or dispersed image dimension along an orthogonal direction in which the image has been dispersed into N discreet image portions, it should be clear that $\Delta l$ is equal to M/N, while $\Delta s$ is equal to $(L - M)/N$. Where M is equal to 2 inches and L is equal to 12 inches, i.e. magnification of 6, the following table gives the dimensions $\Delta l$, $\Delta s$ and the ratio $\Delta s/\Delta l$ for different number of discreet lines or portions N.

TABLE I

| N | $\Delta l$ (in.) | $\Delta s$ (in.) | $\left(\frac{\Delta s}{\Delta l}\right)$ |
|---|---|---|---|
| 2 | 1 | 5 | 5 |
| 4 | .5 | 2.5 | 5 |
| 6 | .33 | 1.67 | 5 |
| 10 | .2 | 1 | 5 |
| 50 | .04 | .2 | 5 |
| 100 | .02 | .1 | 5 |
| 400 | .005 | .025 | 5 |
| 1000 | .002 | .01 | 5 |

It will be observed from the above table that the larger the number N, the smaller the quantities $\Delta l$ and $\Delta s$. However, the ratio $\Delta s/\Delta l$ remains fixed at 5. Stated differently, the sum of the image portion 252 dimensions in one orthogonal direction in FIG. 14 always equals that corresponding dimension of the transparency of which dispersion takes place. The balance of the magnified effective image length is equal to the difference between the length of the effective magnified image minus the length of the original transparency in that direction. Thus, irrespective of how large or small the number N is selected, the quantities $\Delta l$ and $\Delta s$ simultaneously and correspondingly increase or decrease as N is changed. Also, irrespective of the number of image portions into which the image is divided, the sum of the image portion dimensions in one direction will always be constant and will form a constant ratio with respect to the sum of the dimensions of the spaces between the image portions. It will also be noted from the above tabulation, that in order to reduce the spaces $\Delta s$ to small quantities, e.g. 0.01 inches, the number of lines or image portions N must be substantially increased to 1000. However, by so enlarging N, the dimensions of the image portions 252 correspondingly decrease to 0.002 inches.

The number of reflecting surfaces and the dimensions thereof which are ultimately selected will be determined by the resolution which the viewing device will present and the viewing-distance relationships which make viewing of the mosaic or matrix array 250 shown in FIG. 14 comfortable to an observer. In this connection, attention is directed to the "Radio Engineering Handbook", edited by Keith Henney, Fourth Edition, McGraw-Hill Book Company, 1950, pages 997–999. At the cited pages, the "Radio Engineering Handbook" discusses resolution in television sets and the visual acuity of the human eye. The visual acuity of an average normal eye is typically one minute of arc. With such acuity, two stationary dark picture elements spaced a distance $\Delta s$ and separated by a bright element may be barely resolved by the eye at a critical distance $d_c$. Using the properties of a right triangle, the critical distance $d_c$ may be calculated to be equal to $\Delta s/2 \tan \theta$. For a small values of $\theta$, $\Delta s$ is equal to $2d_c$. For $\theta$ equal to 1 minute of arc, the following values of $\Delta s$ have been computed as a function of different critical distances:

TABLE II

| $d_c$ | $\Delta s$ (ft) | $\Delta s$ (in.) |
|---|---|---|
| 1' | .0003 | .0036 |
| 2' | .0006 | .0072 |
| 3' | .0009 | .0108 |
| 4' | .0012 | .0144 |
| 5' | .0015 | .0160 |

It will be noted from Table I that a normal eye barely resolves spaces between adjacent image portions of approximately 100th of an inch when the observer is between approximately 3–5 feet from the viewing screen 22. Such spacing, referring to Table I above, is achieved when approximately one thousand discreet image portions N are formed over a viewing screen of approximately 12 inches. the above "Radio Engineering Handbook" also defines the critical distance as follows: $d_c = 6,876 L/kN$. The utilization ratio $k$ may be selected to be approximately equal to 1 for the present application. This formula gives the critical distance $d_c$ to be approximately 6.88 feet when the number of lines N is selected to be one thousand over a 12 inch screen (L=1 foot). Beyond this critical distance, the normal eye is unable to resolve the spaces actually formed in the projected image. This, of course, assumes that each of the image portions is sharply defined so as to clearly define the spaces $\Delta s$. As to be described hereafter, when the picture element is not sharply defined the visual acuity is reduced and the effective critical distances at which the details of the spaces can be resolved is somewhat reduced. Also, the minimum viewing distance can be increased or decreased determined by the tolerance of the viewer towards the composition of the picture. In connection with television, in which analogous thin lines are similarly observable at close distances, viewing distances less than three times the picture height are seldom considered satisfactory. The above reference gives a viewing distance to picture height ratio of 5:1 to be satisfactory for typical viewing habits.

The critical distance $d_c$ above described assume perfectly sharp peripheral portions of the image portions 252. By imparting to the image portions 252 unclearly defined peripheral edges, or by otherwise enlarging the effective areas of the image portions 252 after they have been so formed, the effective critical area can be reduced. However, it should be made clear at this point that the particular method of reducing the critical distance subsequent to the formation of the mosaic or matrix array 250 does not form a critical part of the present invention and any conventional means may be utilized. Some specific examples of possible means for decreasing the critical distance will now be described.

Figure 15:
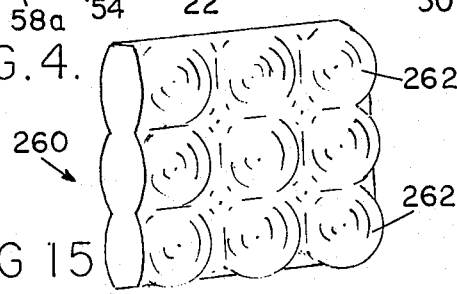
FIG. 15 is a fragmentary perspective view of a lenticular viewing screen which may be utilized to enlarge the image portions illustrated in FIG. 14.

Referring to FIG. 15, a lense array 260 is provided with a plurality of small individual lenses 262 each of which is arranged to be disposed in front of a corresponding image portion 252 in front of or in back of the viewing screen 22 of FIG. 14. Each of the lenses 262 is adapted to enlarge the image portions 252 to thereby decrease the spaces $\Delta s$ and thereby decrease the critical distance at which the viewing screen 22 can be comfortably observed. As shown in FIG. 5, the lens or lenticular array 260 has the lenses 262 disposed in a mosaic or matrix array corresponding to the array 250. Such lenticular array 260 may be formed from glass. However, molded plastic arrays clearly suggest themselves due to their economy and durability, as described in an "Electro-Optical Systems Design" article entitled "Molded-Plastics Optics Are Coming", June, 1972, pages 10–15.

Figures 16, 17:
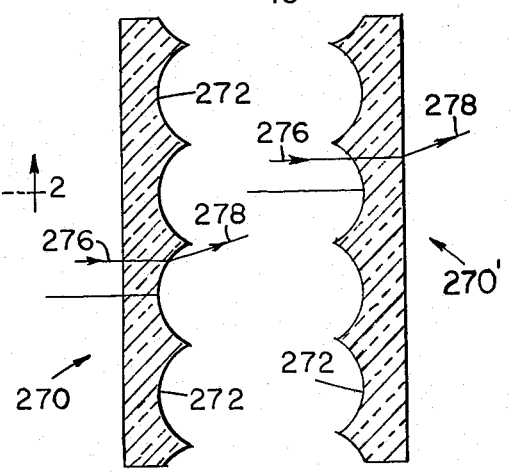
FIGS. 16 and 17 are cross-sections of viewing screens which may be utilized in conjunction with the viewing device shown in FIG. 1 for the purpose of magnifying, externally of the viewing device, the image portions shown in FIG. 14.

Alternately, lenticular screens 270–270' as shown in FIGS. 16, 17 can be utilized as or in addition to the viewing screen 22. Each of the screens is provided with an array of close tiny optical surfaces 272, small enough to correspond to the limit of resolution of the array 250. Each of the optical elements introduces a spreading of the light beam, as represented by rays 276 and 278. For a general description of projection screens of the type under discussion, see "Modern Optics" by Earle B. Brown, Reinhold Publishing Corporation, 1965, starting at page 555.

Figure 18:
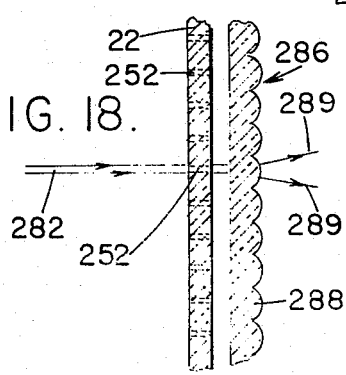
FIG. 18 is a cross-section of another embodiment of the viewing screen utilized in FIG. 1, showing a ground glass surface followed by a magnifying surface in the form of a plurality of plano-convex lenses each disposed opposite a respective image portion formed on the ground glass screen.
Figure 19:
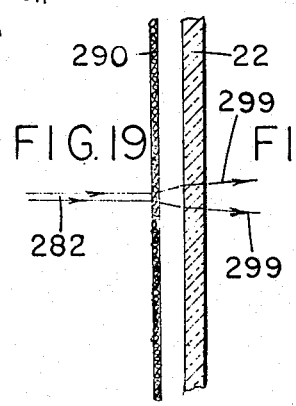
FIG. 19 illustrates another embodiment of the viewing screen utilized with the device of FIG. 1, showing a dispersing or diffracting device proceeding a viewing screen in the form of a ground glass.
Figure 20:
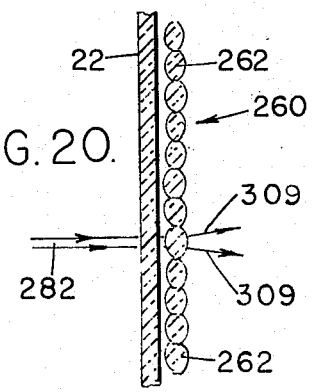
FIG. 20 illustrates a still further embodiment of a viewing screen which may be utilized with the device of FIG. 1 and which includes a ground glass followed by a lenticular screen in the form of an array or matrix of double convex lenses each substantially disposed opposite a respective image portion formed on a ground glass viewing screen.

In FIGS. 18–20, exemplary arrangements are illustrated which provide or introduce a spreading of the light beams representing the image portions 252 formed by the reflecting surfaces of the display device as above described. In FIG. 18, the viewing screen 22 is selected to be a ground glass pane, each of the dashed lines therein representing spaced image portions 252. The incident light ray 282 impinges on the diffusing screen 22 to generate such image portion. According to one possible approach, a planoconcave lenticular array 286 is positioned in front of or on the viewer's side of the screen 22. The image portions 252 which are transmitted through the viewing screen 22 pass through respective plano-concave lenses of the screen 286 and are spread or have their dimensions $\Delta l$ enlarged or magnified by respective plano-convex lenses 288. This is represented by the transmitted light ray 289.

In FIG. 19, spreading of the incident light rays 282, which represent the image portions 252, is obtained by positioning a grating or diffracting screen 290 on the incident side or on the opposite side to the observer's side of the screen 22. Any suitable grating or diffracting screen may be utilized — the screen being so selected so as to diffract or disperse the incident light ray 282. The result of utilizing such a screen 290 is to effect a spreading of the beam, as represented by the beam 299 retransmitted through the ground glass 22. Although the grating or diffracting screen 290 has been shown on the incident side of the screen 22, it is equally possible to position the screen on the other side of the viewing screen.

In FIG. 20, the lenticular lens array 260 is shown disposed on the observer side of the viewing screen 22. The incident light ray 282, representing but a single image portion 252, is shown to pimpinge impinge be transmitted through the screen 222 and through the screen 260. As explained above, a double concave lens 262 is disposed directly in front of the incident light ray 282 so that the latter passes through and is magnified by the respective lens 262. The spreading of the incident beam is represented by the transmitted beam 309.

The object of providing magnifying, diffracting or diffusing screens has been to diminish the sharpness or clarity of the image portions 252 to thereby decrease the effective spaces $\Delta s$ therebetween and decrease the critical distance at which the viewing screen 22 may be viewed without observing the spaces $\Delta s$ therebetween. As exemplified by the above resolution equations, in order to make the screens viewable at reasonable distances, such as 5 feet, a very large number of image portions N must be provided. As set forth in Table I above, in order to provide approximately one thousand discreet image portions 252 along a single planar direction, the dimensions $\Delta l$ of each of image portion decrease to 0.002 inches when a 2 inch transparency is enlarged. Due to the small dimensions of the image portions, it is necessary to insure that the intensity of the incident light beam 48 is sufficiently high so as to make the individual image portions sufficiently brilliant so as to be visible beyond the critical distances.

Another important consideration of the subject display device is the manner in which a large number, i.e. 500 and up, image portions may be provided. The planar reflectors 180, 190 and 200 are especially suitable when used in conjunction with diffracting, diffusing or magnifying screens as above described. The number of reflecting surfaces which can be provided with planar reflectors as suggested above may make it impractical to provide a very large number of reflecting surfaces, above several hundred. However, where the critical distance can be increased and the number of reflecting surfaces can be reduced to several hundred, the above described planar reflectors may be used.

Where very large number of reflecting surfaces are to be utilized, other possible approaches of manufacture are possible. It is possible, for example, to embed a planar surface 90c with an extremely large number of minute reflective elements whose reflective surfaces may be positioned at the desired angular orientations by suitable mechanical or electric or magnetic means. For example, a very large quantity of metallic platelets or chips may be suitably oriented by placing the planar member 90c in a magnetic field while the latter is still in a softened condition. After the reflecting elements have been properly aligned, the planar member 90c may be permitted to harden. In this manner, and other similar approaches, randomly positioned reflecting surfaces approaching microscopic dimensions may be provided to reflect the incident light beams as described in connection with FIG. 13. However, where such random positioning of minute reflecting elements is utilized, the mosaic or matrix array 250 described in connection with FIG. 14 is no longer obtainable. Instead, the resulting light rays incident on the viewing screen 22 acquire cross sectional areas corresponding to the minute dimensions of the reflecting surfaces. With such arrangements, the magnification approaches that described to the ideal planar reflector 90a of FIG. 6. In this, as in the other cases, the intensity of the incident light beam 48 which passes through the transparent portion 60 must be sufficiently intense to as to be capable of projecting sufficiently brilliant image portions on the viewing screen which will be detectable at or beyond the critical distances.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Display device for enlarging a two-dimensional image at least along one of its planar directions, comprising light beam forming means for forming a light beam having substantially parallel light ray portions oriented in a first direction, said parallel light ray portions together defining the image; scattering means for separating, along a direction corresponding to a planar direction of the image, said light ray portions into a plurality of spaced, substantially parallel light rays and for directing said light rays in spaced relation to one another in a second direction, whereby the dimension of the image as defined by said spaced light rays is greater than the corresponding dimension of the original image along said planar direction; and projecting screen means arranged to intercept said spaced light rays for forming an image defined by the latter.

2. Display device as claimed in claim 1, wherein said scattering means comprises a plurality of reflecting surfaces arranged so as to generally define a plane forming a predetermined angle with said first direction, each of said reflecting surfaces forming an angle with said first direction which is different from said predetermined angle and selected so as to establish an effective angle of reflection of said light rays with respect to said plane which is smaller than an effective angle of incidence of said light ray portions with respect to said plane when said light ray portions impinge on and said light rays reflect from said reflecting surfaces.

3. Display device as defined in claim 2, wherein said reflecting surfaces are elongate and generally extend in directions normal to both the directions of said light ray portions and said light rays, said reflecting surfaces being parallel to one another and spaced from each other along said first direction.

4. Display device as defined in claim 2, wherein the angle formed between each reflecting surface and said first direction is equal to 45°.

5. Display device as defined in claim 2, wherein said predetermined angle is selected to be equal to less than 45°.

6. Display device as defined in claim 1, wherein said projecting screen means includes diffusing means for diffusing said light rays.

7. Display device as defined in claim 1, wherein said projecting screen comprises a magnifying means for magnifying said light rays.

8. Display device as defined in claim 1, wherein an image is enlarged along two planar direction, and wherein first and second scattering means are provided, a first scattering means being arranged for separating the light ray portions into a plurality of first light rays along a direction corresponding to one planar direction of the image and for directing said first light rays in spaced relationship to one another in a second direction, and wherein said second scattering means is arranged for separating said first light rays into a plurality of second light rays along a direction corresponding to another planar direction of the image and for directing said second light rays in spaced relationship to one another in a third direction.

9. Display device as defined in claim 2, wherein the complementary angle of said predetermined angle is $\phi$, and wherein the degree to which the image is enlarged along said planar direction is defined by the following relation for magnification m:

$$\phi = \tan^{-1} m$$

for angles of $\phi$ at least equal to 45°.

10. Display device as defined in claim 8, wherein said first, second and third directions are mutually orthogonal to each other.

11. Display device as defined in claim 10, wherein the device is mountable on a wall, and further comprising a substantially rectangular planar enclosure having spaced horizontal and vertical sides when mounted on a wall, said enclosure having a depth substantially smaller than its height and width, said enclosure having at least one elongated outer chamber along one of its sides and a central rectangular chamber, wherein said first scattering means is positioned in said one outer chamber and said second scattering means is positioned in said central chamber said screen means generally defining a plane parallel to said planar enclosure and forming one exterior wall of said central chamber, said first and second scattering means being arranged so that said first light rays are directed from said one outer chamber into said central chamber along said second direction substantially parallel to one of said spaced sides, and so that said second light rays are directed from said central chamber into said screen means along said third direction substantially normal to the plane defined by said screen means.

12. Display device as defined in claim 10, wherein said enclosure includes means for receiving a photographic transparency; and wherein said light beam forming means comprises means for transmitting substantially parallel light through a transparency along said first direction substantially parallel to the other of said spaced sides.

13. Display device as defined in claim 11, wherein said enclosure is provided with four elongated outer chambers two of which form said spaced horizontal sides and two of which form said spaced vertical sides, said one outer chamber being one of said vertical outer chambers, said means for transmitting parallel light being arranged to project said parallel light at least partially through one of said vertical chambers, said light means further comprising electrical energy producing means provided in either one of said outer of said vertical outer chambers and other of said horizontal chambers and connected to said means for transmitting parallel light; and mirror means for deflecting said parallel light in said one of said horizontal outer chambers along said first direction in said one of said vertical outer chambers.

14. A method of enlarging a twodimensional image at least along one of its planar directions comprising the steps of forming a light beam having substantially parallel light ray portions oriented in a first direction, said parallel light ray portions together defining the image; separating said light ray portions, along a direction corresponding to a planar direction of the image, into a plurality of spaced, substantially parallel light rays; directing said light rays in spaced relation to one another in a second direction, whereby the dimensions of the image defined by said light rays is greater than the corresponding dimension of the original image along said planar direction; and intercepting said spaced light rays with a projecting screen to form an image defined by said spaced light rays.

15. A method as defined in claim 14, further comprising the step of diffusing each of said spaced light rays.

16. A method as defined in claim 14, further comprising the step of magnifying each of said spaced light rays.

17. A method as defined in claim 14, wherein the image is enlarged along another of its planar directions, further comprising the step of separating said light rays into another plurality of light rays along a direction corresponding to another planar direction of the image; and directing said other light rays in spaced relation to one another in a third direction, said first, second and third directions being so selected so that they are mutually orthogonal.

18. Display device mountable on a wall comprising a substantially rectangular enclosure having spaced horizontal and vertical sides when mounted on the wall, said enclosure having a depth substantially smaller than the height and width thereof, said enclosure having at least one elongated outer chamber extending along one of its sides and a central rectangular chamber; light beam forming means within said enclosure for forming a light beam having cross sectional dimensions corresponding to an image having predetermined first and second normal planar directions and for directing the same into said elongate outer chamber, said light beam being defined by a plurality of contiguous parallel light ray portions; first scattering means in said elongate outer chamber in the path of said light beam for intercepting the latter and separating said contiguous light ray portions along a direction corresponding to one planar dimension of the image into a plurality of spaced first light rays and reflecting the same into said central rectangular chamber; a second scattering means in said central rectangular chamber in the path of said first light rays for intercepting the latter and separating the same along a direction corresponding to another normal planar dimension of the image into a plurality of spaced second light rays and reflecting the same in a direction substantially normal to the rectangular enclosure; and projecting screen means in the path of said spaced second light rays for intercepting the same and for forming an image defined by the latter.

* * * * *